C. SCHULZE.
APPARATUS FOR DISTRIBUTING POWDERED MATERIAL.
APPLICATION FILED OCT. 7, 1918.
1,295,609.
Patented Feb. 25, 1919.
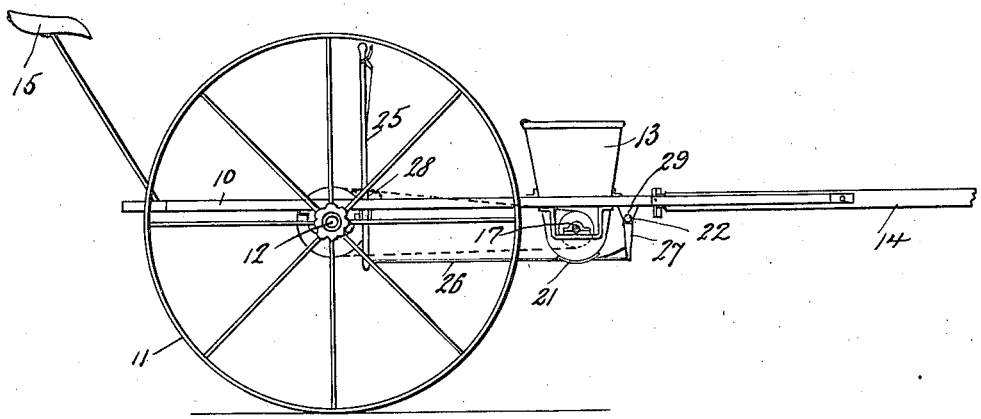
Fig. 1.
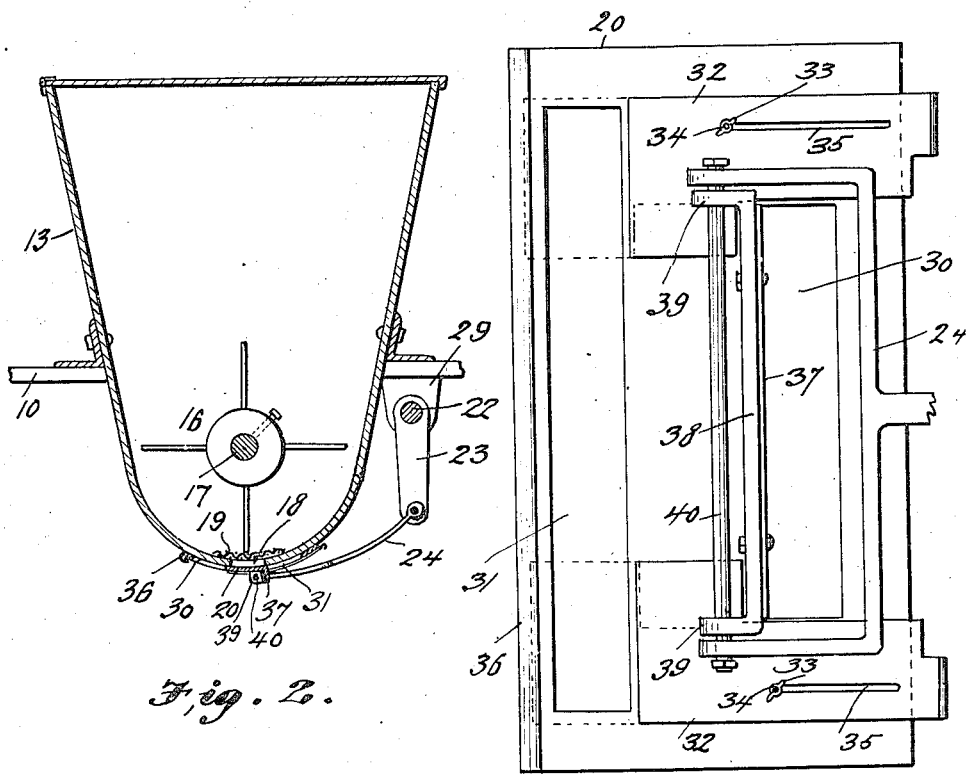
Fig. 2.
Fig. 3.
Inventor
Charles Schulze
By Max A. Schmidt
Attorney

UNITED STATES PATENT OFFICE.

CHARLES SCHULZE, OF RICE LAKE, WISCONSIN.

APPARATUS FOR DISTRIBUTING POWDERED MATERIAL.

1,295,609.   Specification of Letters Patent.   Patented Feb. 25, 1919.

Application filed October 7, 1918. Serial No. 257,220.

*To all whom it may concern:*

Be it known that I, CHARLES SCHULZE, a citizen of the United States, residing at Rice Lake, in the county of Barron and State of Wisconsin, have invented certain new and useful Improvements in Apparatus for Distributing Powdered Material, of which the following is a specification.

This invention relates to apparatus for applying an insecticide in powdered form to growing plants, such as potatoes, etc., although it is not limited to such use but may also be employed for distributing lime, fertilizer, and the like.

The invention has for its object to provide in an apparatus or machine of the kind stated a novel and improved material-distributing means which is adjustable to discharge the material in streams of different widths and quantity, whereby the machine is made readily adjustable for the treatment of plants of different kinds and conditions.

The object stated is attained by means of a combination and arrangement of parts to be hereinafter described and claimed, and in order that the same may be better understood, reference is had to the accompanying drawing forming a part of this specification.

In the drawing, Figure 1 is a side elevation of the machine; Fig. 2 is a cross-section showing the outlet of a material distributing hopper, and Fig. 3 is a plan view showing a controlling gate.

Referring specifically to the drawing, the frame 10 of the machine is wheel-supported, one of the wheels being shown at 11, and its axle at 12. The frame is suitably constructed to support one or more hoppers 13 containing the powdered or other material to be distributed. A draft tongue is shown at 14, and a seat for the driver at 15.

The hopper 13 contains an agitator 16 of conventional form, carried by a shaft 17 which obtains motion from the axle 12 through some suitable gearing.

The hopper 13 has a bottom outlet opening 18 over which is mounted a screen 19. The outlet opening is controlled by a gate or closure comprising a slidable plate 20 supported in guides 21 on the hopper bottom along opposite sides of the opening.

The following means are provided for controlling the gate 20:

In front of the hopper 13 extends a rock shaft 22 provided with a rocker arm 23. To the bottom of the gate 20 is pivoted a yoke 24 connected to the rocker arm 23, in view of which it will be seen that the gate is slid in its guides 21 when the shaft 22 is rocked.

The shaft 22 is actuated by a hand lever 25 connected by a rod 26 to a rocker arm 27 on said shaft. The hand lever is suitably supported by the frame of the machine, and is provided with the usual locking means 28. The frame of the machine also carries suitable bearings 29 for the shaft 22.

The gate 20 has two discharge slots 30 and 31, respectively, either one of which is adapted to register with the hopper outlet 18 upon proper manipulation of the hand lever 25. It will be noted that the slots are of different lengths, so that the material may be discharged in streams of two different widths.

The gate 20 is also provided with means for shortening the length of the longer one of the slots, this being the slot 31, so that a third adjustment is rendered possible. This adjustment is effected by two slides 32 positioned adjacent to the ends of the slot 31, and adapted to be slid across the end portions thereof as shown dotted in Fig. 3. These slides are curved plates mounted on the bottom of the gate, and adjustably held thereon by wing nuts 33 screwed on threaded studs 34 carried by the gate and passing through slots 35 in the plates. The plates are reduced at one end to clear the ends of the slot 30 when they are retracted to obtain the full width of the slot 31. The forward end of the gate has a rolled edge to provide a channel 36 in which the forward ends of the slide plates seat when they are advanced to shorten the slot 31, said channel therefore assisting to support the plates when in this position.

At one of the longitudinal edges of the slot 30, the material out of which the gate 20 is made is bent downward to form an outstanding flange 37 to which is bolted or otherwise secured a bar 38 having laterally extending end portions 39 which support the pivot rod 40 of the yoke 24. It will be noted that the spread of the yoke branches is such that they clear the slot 30 so as to leave the same unobstructed.

I claim:

1. The combination with a material-distributing receptacle having an outlet, of a slidable gate for the outlet, said gate having an opening adapted to register with the outlet, and slides mounted on the gate and adjustable to extend across the end portions of the opening to reduce the length of said opening.

2. The combination with a material-distributing receptacle having an outlet, of a slidable gate for the outlet, said gate having openings of different widths adapted to register with the outlet, and slides mounted on the gate and adjustable to extend across the end portions of one of the openings to reduce the width of said opening.

3. The combination with a material-distributing receptacle having an outlet, of a slidable gate for the outlet, said gate having an opening adapted to register with the outlet, and slides on the gate and adjustable to extend across the end portions of the opening to reduce the length of said opening, the end of the gate toward which the slides are movable as stated being provided with channels in which the forward edge portions of the slides are adapted to seat.

4. The combination with a material-distributing receptacle having an outlet, of a slidable gate for the outlet, said gate having an opening adapted to register with the outlet, a yoke pivotally connected to the gate and having its branches straddling the opening and clear of the same, and operating means connected to the yoke for controlling the gate.

5. The combination with a material distributing receptacle having an outlet, of a slidable gate for the outlet, said gate having an elongated opening extending transversely thereof and adapted to register with the receptacle outlet, and slides mounted on the gate and adjustable to extend across the end portions of the opening to reduce the length of the opening.

In testimony whereof I affix my signature.

CHARLES SCHULZE.